United States Patent [19]

Dixon

[11] 4,225,445
[45] Sep. 30, 1980

[54] POLYMERS FOR ACID THICKENING

[75] Inventor: Kenneth W. Dixon, Sewickley, Pa.

[73] Assignee: Calgon Corporation, Pittsburgh, Pa.

[21] Appl. No.: 960,809

[22] Filed: Nov. 15, 1978

[51] Int. Cl.$^2$ ............................................. E21B 43/27
[52] U.S. Cl. ............................... 252/8.55 C; 166/307;
      252/8.5 C; 252/8.55 R; 260/29.6 H; 526/295
[58] Field of Search ..................... 252/8.55 R, 8.55 C,
                                252/8.5 C; 526/295; 166/307

[56] References Cited

U.S. PATENT DOCUMENTS

| 3,153,450 | 10/1964 | Foster et al. .................... 252/8.55 X |
| 3,442,803 | 5/1969 | Hoover et al. ...................... 252/8.55 |
| 3,923,666 | 12/1975 | Dill .................................. 166/307 X |
| 3,968,037 | 7/1976 | Morgan et al. ......................... 210/47 |
| 4,100,079 | 7/1978 | Sinkovitz et al. .................... 252/8.55 |
| 4,107,057 | 8/1978 | Dill et al. ............................. 252/8.55 |

*Primary Examiner*—Herbert B. Guynn
*Attorney, Agent, or Firm*—Mario A. Monaco; Martin L. Katz

[57] ABSTRACT

Acids, thickened with branched emulsion or suspension polymers of diallyldimethylammonium chloride are useful as oil well drilling and fracturing fluids for stimulating well production and in other applications, such as thickeners for cosmetics, paints, adhesives, textiles and printing inks.

3 Claims, No Drawings

POLYMERS FOR ACID THICKENING

BACKGROUND OF THE INVENTION

The present invention relates to compositions and a method for the hydraulic fracturing of subterranean formations penetrated by a well. Particularly, the present invention relates to the use as hydraulic fracturing fluids of acids, especially acid solutions thickened with branched emulsion or suspension polymers of diallyldimethylammonium chloride. Suitable branching agents which may be used include, but are not limited to, triallylmethylammonium chloride, tetraalylammonium chloride and bis-diallyl ammonium salts, such as tetraallylpiperazinium chloride and N,N,N',N'-tetraallyl-N,N'-dimethyl hexamethylenediammonium chloride.

In the art of producing oil or gas from a subterranean formation, it is well known that production can be greatly increased by hydraulically fracturing the formation. In a hydraulic fracturing operation, a fracturing fluid is forced down a well bore under high pressures to fracture the rock formation surrounding the well bore. The pressure is then released allowing the oil or gas to seep through the fractures into the well bore where it is then pumped to the surface.

Most commonly, fresh water or aqueous brine are used as the fracturing medium in oil field operations. The brines usually contain from a few parts per million to high percentages of dissolved salts. In fact, oil field brines sometimes contain total dissolved solids of up to about 10 percent or higher. Particularly, common brines which are difficult to use with polymeric additives are those having dissolved alkaline earth metal salt concentrations of more than 1,000 ppm. Most oil field brines contain at least several hundred ppm of calcium in addition to 2 percent or more sodium chloride and potassium chloride.

In addition, it is also well known in the art of producing oil or gas from a subterranean formation that fluid production can occasionally be stimulated by injecting acid solutions into the formation by way of the well bore. This is especially true when the reservoir contains large amounts of carbonate rock such as limestone, dolomite, and the like. The acid reacts with the carbonate content of the rock, thereby creating channels in the rock between the reservoir and the well bore. This increases the effective drainage area of the well bore, stimulating production.

The most commonly used acid for this purpose is hydrochloric. However, other acids, such as hydrofluoric, nitric, formic, acetic and sulfuric have also been highly successful in increasing production in calcareous formations. Mixtures of two or more different acids have also been used, especially mixtures containing hydrofluoric acid. The acids are usually employed as 1 percent to 35 percent by weight solutions in water. However, because of the scarcity of fresh water and economics, it is often necessary to employ oil field brine as the aqueous medium in place of water. In these cases, the aqueous medium will be an acidic brine.

Acidizing and hydraulic fracturing are generally combined into one treatment by employing an acidic fluid under hydraulic fracturing pressures. This combination treatment of the well is called acid fracturing and it stimulates production by obtaining the benefits of both the chemically created fractures. When acid fracturing, the aqueous fluid may be an acid solution or an acidic brine as described above.

It is desired that the fracturing fluid be viscous in nature since this will permit the fracturing fluid to remain in the fracture long enough to permit build-up and maintenance of sufficient pressure to open a fracture. Moreover, a viscous fracturing fluid is capable of supporting propping agents, which are particulated solids suspended in the fracturing fluid for the purpose of maintaining the fracture in an open condition, by being deposited in the fracture once created. Generally, it is desired that the fracturing fluid have a viscosity of at least about 25 centipoises, as measured by Fann Model 35 Viscometer at 25° C. and at 100 rpm.

SUMMARY OF THE INVENTION

Branched emulsion or suspension polymers of diallyldimethylammonium chloride are useful as acid thickeners in oil well drilling and fracturing operations because of their acid stability, heat stability and salt stability. Suitable branching agents which may be used include, but are not limited to, triallylmethylammonium chloride, tetraallylammonium chloride and bis-diallyl ammonium salts, such as tetraallylpiperazinium chloride and N,N,N',N'-tetraallyl-N,N'-dimethyl hexamethylenediammonium chloride.

These polymers may be prepared by emulsion or suspension polymerization techniques such as that described in U.S. Pat. No. 3,968,037 and may contain from about 95 to about 99.99 mole percent diallyldimethylammonium chloride and from about 0.01 to about 5 mole percent of one of the aforementioned branching agents.

The thickening agents of the present invention are useful over a wide range of molecular weights, from as little as about 5,000 to as much as several hundred thousand to one million or more. The molecular weight utilized will be determined by a number of factors, but generally, the higher molecular weight materials will produce proportionately more thickening of the acid-based liquid, which is ordinarily desired.

The thickening agents of the present invention may be employed satisfactorily in concentration amounts as low as 0.01 percent by weight of the acid-based liquid being thickened. Higher concentrations of 10 percent by weight or more may be employed, but the range of concentration amounts will ordinarily be from about 0.1 to about 5 percent by weight. As with molecular weight of the polymeric thickening agents of the present invention, the concentration of the thickening agent which is desired will depend on a number of factors, but especially upon the viscosity of the final thickened acid composition which is desired.

In accordance with the present invention, the branched emulsion or suspension polymers of diallyldimethylammonium chloride operate as thickening agents for acid solutions in that when added to the acid solutions in an effective concentration amount, they produce an increase in the viscosity of the solutions. The increase in viscosity may be extensive enough to produce a gel, although this is not essential.

The acid solution fracturing fluids with which the thickening agents comprising the branched emulsion or suspension polymers of diallydimethylammonium chloride are used can also contain fluid loss control additives, surfactants, propping agents and clay control chemicals which are compatible with the thickening agents of the present invention.

The polymers of the present invention may also be used as thickeners for other applications, such as cosmetics, paints, adhesives, textiles and printing inks.

The following examples illustrate the ability of the branched emulsion polymers of diallyldimethylammonium chloride thickening agents of the present invention to increase the viscosity of acids.

EXAMPLE 1

To a 500 ml flask were added 192 g of benzene, 83.1 g of a 71.4% aqueous solution of diallyldimethylammonium chloride, 0.59 g of a 81.5% aqueous solution of triallylmethylammonium chloride and 23.8 g of Triton X-301 (Rohm and Haas). With agitation, the emulsion was heated to 50° C. and purged with nitrogen for one hour. To the white emulsion were added 0.8 ml of a solution of ferrous ammonium sulfate hexahydrate (0.351 g/100 ml) and 0.20 ml of Lupersol 11. After 20 hours, the emulsion was cooled. The polymer was precipitated from excess acetone. After drying, the yield of polymer was 54.9 g (91.8%).

EXAMPLE 2

Solutions of the polymer from Example 1 were prepared at 1.0 and 1.5% polymer in 15 and 28% hydrochloric acid. The viscosities of these solutions were measured at room temperature using a Fann Model LVT Viscometer, Spindle No. 1, at 300 rpm. The results of the determinations are illustrated in the following table:

TABLE I

| HCl | Viscosity (cps) Polymer Conc. (%) | |
|---|---|---|
| Conc. (%) | 1.0 | 1.5 |
| 15 | 21.5 | 94.5 |
| 28 | 33.0 | 115.0 |

After being stored for 6 hours at 65° C. in an oven, the viscosities of the polymer solutions were measured again (at 65° C.) and the results are illustrated in the following table:

TABLE II

| HCl | Viscosity (cps) Polymer Conc. (%) | |
|---|---|---|
| Conc. (%) | 1.0 | 1.5 |
| 15 | 15.0 | 62.0 |
| 28 | 22.5 | 75.5 |

The solutions were again returned to the oven (65° C.) for 2.8 days and the viscosities were rechecked at 65° C. and the results are illustrated in the following table:

TABLE III

| HCl | Viscosity (cps) Polymer Conc. (%) | |
|---|---|---|
| Conc. (%) | 1.0 | 1.5 |
| 15 | 14.5 | 70.5 |
| 28 | 23.5 | 78.0 |

I claim:

1. A method of fracturing a subterranean formation comprising:
    (a) contacting said formation with an aqueous acid-containing fracturing fluid, said acid being capable of reacting with subterranean carbonate formations, which contains as a thickening agent therefor a branched emulsion polymer of diallyldimethylammonium chloride having a molecular weight of at least 5000 and wherein a member selected from the group consisting of triallylmethylammonium chloride, tetraallylammonium chloride, tetraallylpiperazinium chloride and N,N,N',N'-tetraallyl-N,N'-dimethyl hexamethylenediammonium chloride is utilized as the branching agent in the polymerization of the diallyldimethylammonium chloride said polymer containing from about 95 to 99.99 mole percent of diallyl dimethyl ammonium chloride and from about 0.01 to about 5 mole percent of said branching agent;
    (b) applying sufficient pressure to the said fracturing fluid to fracture said formation; and
    (c) maintaining said pressure while forcing said fracturing fluid into said fracture.

2. A fracturing fluid composition for use in fracturing subterranean formations comprising:
    (a) water;
    (b) an acid which is capable of reacting with subterranean carbonate formations; and
    (c) at least 0.01 percent by weight of the acid of a thickening agent composition consisting essentially of branched emulsion polymer of diallyldimethylammonium chloride having a molecular weight of at least 5000 and wherein a member selected from the group consisting of triallylmethylammonium chloride, tetraallylammonium chloride, tetraallylpiperazinium chloride and N,N,N',N'-tetraallyl-N,N'-dimethyl hexamethylenediammonium chloride is utilized as the branching agent in the polymerization of the diallyldimethylammonium chloride said polymer containing from about 95 to 99.99 mole percent of diallyl dimethyl ammonium chloride and from about 0.01 to about 5 mole percent of said branching agent.

3. A method of thickening a mixture of water and one acid which is capable of reacting with subterranean carbonate formations, said method comprising adding thereto at least 0.01 percent by weight of the acid and water of a thickening agent composition consisting essentially of a branched emulsion polymer of diallyldimethylammonium chloride having a molecular weight of at least 5000 and wherein a member selected from the group consisting of triallylmethylammonium chloride, tetraallylammonium chloride, tetraallylpiperazinium chloride and N,N,N',N'-tetraallyl-N,N'-dimethyl hexamethylenediammonium chloride is utilized as the branching agent in the polymerization of the diallyldimethylammonium chloride said polymer containing from about 95 to 99.99 mole percent of diallyl dimethyl ammonium chloride and from about 0.01 to about 5 mole percent of said branching agent.

* * * * *